DESIGN.
F. M. ASHLEY.
INKSTAND.
APPLICATION FILED JAN. 14, 1913.
Reissued Dec. 23, 1913. 13,659.
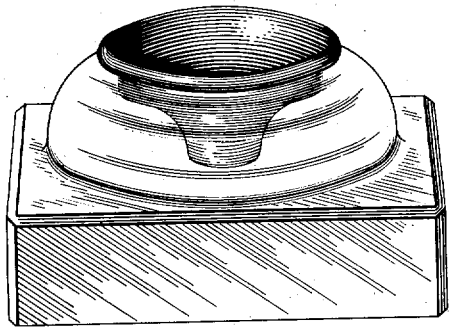
Witnesses:
Minnie S. Miller
Nathan Cohen
Inventor
Frank M. Ashley

UNITED STATES PATENT OFFICE.

FRANK M. ASHLEY, OF BROOKLYN, NEW YORK.

DESIGN FOR AN INKSTAND.

13,659. Specification for Reissued Design. Reissued Dec. 23, 1913.

Original No. 37,504, dated August 8, 1905, Serial No. 262,949, for 14 years. Application for reissue filed January 14, 1913. Serial No. 742,086.

*To all whom it may concern:*

Be it known that I, FRANK M. ASHLEY, a citizen of the United States, residing at Brooklyn, in the county of Kings, State of New York, have invented a new, original, and ornamental Design for Inkstands, of which the following is a specification, reference being had to the accompanying drawing, forming part thereof.

The figure is a perspective view of an ink stand showing my new design.

The essential feature of my design consists in the general outline of the stand which comprises a low, broad, flat base surmounted by a low dome in which a funnel shaped dip cup is located.

Having thus described my invention, I claim,—

An ornamental design for an ink stand, consisting of a low, broad, flat base surmounted by a low dome and a funnel shaped dip cup located within the dome, substantially as shown and described.

Signed in the county of New York, State of New York, this 4th day of January, 1913.

FRANK M. ASHLEY.

In the presence of—
NATHAN COHEN,
MINNIE S. MILLER.